United States Patent
Nakajima

(10) Patent No.: US 7,823,616 B2
(45) Date of Patent: Nov. 2, 2010

(54) PNEUMATIC RADIAL TIRE WITH BELT REINFORCING LAYER CORD HAVING SPECIFIED HEAT SHRINKAGE STRESS

(75) Inventor: Daisuke Nakajima, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 756 days.

(21) Appl. No.: 11/795,517

(22) PCT Filed: Jan. 20, 2006

(86) PCT No.: PCT/JP2006/300870
§ 371 (c)(1),
(2), (4) Date: Jul. 18, 2007

(87) PCT Pub. No.: WO2006/077978
PCT Pub. Date: Jul. 27, 2006

(65) Prior Publication Data
US 2008/0135152 A1    Jun. 12, 2008

(30) Foreign Application Priority Data
Jan. 21, 2005  (JP) .............................. 2005-014155
Jan. 21, 2005  (JP) .............................. 2005-014336

(51) Int. Cl.
*B60C 9/22*   (2006.01)
*B60C 9/20*   (2006.01)
*B60C 9/00*   (2006.01)
*D02G 3/48*   (2006.01)

(52) U.S. Cl. ...................... 152/527; 152/451; 152/531; 152/533; 428/394

(58) Field of Classification Search ................. 152/451, 152/527, 531, 533; 428/394
See application file for complete search history.

(56) References Cited

U.S. PATENT DOCUMENTS

2002/0017351 A1   2/2002  Miyazaki et al.
2002/0195185 A1   12/2002 Choi et al.

FOREIGN PATENT DOCUMENTS

| JP | 3-70602 A | 3/1991 |
| JP | 2000-142025 A | 5/2000 |
| JP | 2001-262437 A | 9/2001 |
| JP | 2001-295134 A | 10/2001 |

(Continued)

OTHER PUBLICATIONS

English machine translation of JP 2001-295134 A, Oct. 26, 2001.*
English machine translation of JP 2004-218189 A, Aug. 5, 2004.*
Supplementary European Search Report for EP 06 71 2095 dated Jun. 25, 2009.

*Primary Examiner*—Adrienne C Johnstone
(74) *Attorney, Agent, or Firm*—Sughrue Mion, PLLC

(57) ABSTRACT

This invention relates to a pneumatic radial tire being excellent in steering stabilities during low-speed running and high-speed running, and more particularly to a pneumatic radial tire comprising at least one belt reinforcing layer 6A, 6B disposed on a belt 5 outward in a radial direction of the tire, characterized in that a reinforcing element constituting the belt reinforcing layer 6A, 6B is a polyketone fiber cord satisfying conditions of the following equations (I) and (II):

$$\sigma \geq -0.01 \times E + 1.2 \qquad (I)$$

$$\sigma \geq -0.02 \qquad (II)$$

[wherein $\sigma$ is a thermal shrinkage stress (cN/dtex) at 177° C.; and E is an elastic modulus (cN/dtex) at 25° C. under a load of 49 N].

12 Claims, 3 Drawing Sheets

FOREIGN PATENT DOCUMENTS

| | | |
|---|---|---|
| JP | 2001-334807 A | 12/2001 |
| JP | 2001-334811 A | 12/2001 |
| JP | 2002-307909 A | 10/2002 |
| JP | 2003-252005 A | 9/2003 |
| JP | 2004-218189 A | 8/2004 |
| JP | 2004-306633 A | 11/2004 |

* cited by examiner

PNEUMATIC RADIAL TIRE WITH BELT REINFORCING LAYER CORD HAVING SPECIFIED HEAT SHRINKAGE STRESS

TECHNICAL FIELD

This invention relates to a pneumatic radial tire, and more particularly to a pneumatic radial tire being excellent in the steering stabilities during both low-speed running and high-speed running as well as a pneumatic radial tire being excellent in the steering stabilities during both the low-speed running and the high-speed running but also suppressing a belt edge separation (BES) without contacting cords in a belt reinforcing layer and cords in a belt with each other.

BACKGROUND ART

Currently, a belt commonly used as a reinforcing member for a carcass being a bone structure in a radial tire for a passenger car, particularly a reinforcing member for a crown portion of the carcass is mainly constituted by using two or more belt layers each composed of a rubberized layer containing steel cords arranged slantly with respect to an equatorial plane of the tire and crossing the steel cords of these belt layers with each other.

Also, a belt reinforcing layer formed by rubberizing reinforcing elements such as nylon cords or the like may be disposed on an outside of the belt in a radial direction of the tire in order to improve the stability during the running of the tire, particularly the stability during the high-speed running and further improve the durability of the tire by preventing the peeling of the belt layer during the high-speed running, particularly the peeling notably caused at end portions of the belt layer. As the structure of the belt reinforcing layer is known a so-called cap-layer structure or the like. The stability during the running of the tire can be improved by disposing the belt reinforcing layer containing the reinforcing elements such as nylon cords or the like to suppress a size growth of the tire in the radial direction during the running.

DISCLOSURE OF THE INVENTION

However, since an elastic modulus in most organic fiber cords such as nylon cords and the like commonly used as a reinforcing element of the belt reinforcing layer is lowered with the rise of the temperature, tires provided with the belt reinforcing layer containing these general-purpose organic fiber cords as a reinforcing element have a problem that the hoop effect of the belt reinforcing layer is decreased to push out a tread when the temperature of the tire rises during the high-speed running and the centrifugal force applied to the tire increases, and hence the ground contacting shape of the tire during the high-speed running is largely changed to lose the running stability.

On the contrary, in order to suppress the change of the ground contacting shape of the tire during the high-speed running, cords having a high stiffness and causing no declining of the elastic modulus at an elevated temperature such as aramid fiber cords and the like may be used in the belt reinforcing layer. However, the high stiffness cords such as aramid fiber cords and the like are excessively high in the elastic modulus at room temperature, so that tires provided with the belt reinforcing layer containing the high stiffness cords as a reinforcing element are insufficient in the ground contacting area during the low-speed running. Therefore, the tire provided with the belt reinforcing layer containing as a reinforcing element the high stiffness cords such as aramid fiber cords and the like has a problem that it is inferior in the steering stability during the low-speed running (i.e., when the temperature of the tire is low and the centrifugal force applied to the tire is small) though it is excellent in the steering stability during the high-speed running.

It is, therefore, the first object of the invention to provide a pneumatic radial tire being excellent in the steering stabilities during low-speed running and high-speed running.

Moreover, cords having a twin strand structure obtained by twisting two filament bundles are commonly used as a tire cord. In this case, the fatigue resistance of the cord can be improved by twisting the two filament bundles to improve the uniting force between the filaments. However, since the cord having the twin strand structure is thick in the cord diameter, when such a cord is used in the belt reinforcing layer, there is a problem that the cords in the belt reinforcing layer become easily contacted with the cords (commonly steel cords) in the belt layer and the peeling at the end portions of the belt or so-called belt edge separation (BES) is easily caused. Furthermore, in case of producing the cords having the twin strand structure, it is required to take a long time in the twisting step, so that the cost of processing becomes high and there is a problem in the production cost.

It is, therefore, the second object of the invention to provide a pneumatic radial tire being excellent in the steering stabilities during the low-speed running and the high-speed running but also suppressing a belt edge separation (BES) without contacting cords in a belt reinforcing layer and cords in a belt with each other.

The inventor has made various studies in order to achieve the first object and discovered that when a polyketone fiber cord having specified thermal shrinkage stress and elastic modulus is used as a reinforcing element of a belt reinforcing layer in the pneumatic radial tire provided with the belt reinforcing layer disposed at the outside of the belt in a radial direction, the ground contacting area of the tire during the low-speed running can be sufficiently assured to improve the steering stability during the low-speed running but also the belt reinforcing layer develops a high hoop effect during the high-speed running based on the thermal shrinkage stress to improve the steering stability during the high-speed running.

Also, the inventor has made further studies in order to achieve the second object and discovered that when a polyketone fiber cord having specified thermal shrinkage stress and elastic modulus and a single strand structure is used as a reinforcing element of a belt reinforcing layer in the pneumatic radial tire provided with the belt reinforcing layer disposed at the outside of the belt, the ground contacting area of the tire during the low-speed running can be sufficiently assured to improve the steering stability during the low-speed running but also the belt reinforcing layer develops a high hoop effect during the high-speed running to improve the steering stability during the high-speed running and further an interlayer gauge between the belt and the belt reinforcing layer can be sufficiently assured to suppress the belt edge separation (BES), and as a result the invention has been accomplished.

That is, the pneumatic radial tire according to the invention comprises a pair of bead portions, a pair of sidewall portions, a tread portion continuing to both the sidewall portions, a carcass toroidally extending between the pair of bead portions, a belt disposed on a crown portion of the carcass outward in a radial direction of the tire and comprised of at least two belt layers, and at least one belt reinforcing layer disposed on the belt outward in a radial direction of the tire so as to cover a whole and/or both end portions of the belt and composed of a rubberized layer containing a reinforcing element arranged substantially in parallel to the circumferential direction of the tire, and is characterized in that the reinforcing element constituting the belt reinforcing layer is a polyketone fiber cord satisfying conditions of the following equations (I) and (II):

$$\sigma \geq -0.01 \times E + 1.2 \quad \text{(I)}$$

$$\sigma \geq -0.02 \quad \text{(II)}$$

[wherein σ is a thermal shrinkage stress (cN/dtex) at 177° C.; and E is an elastic modulus (cN/dtex) at 25° C. under a load of 49 N].

The thermal shrinkage stress σ at 177° C. of the polyketone fiber cord used herein is a stress generated at 177° C. in the cord when a sample of the polyketone fiber cord having a fixed length of 25 cm and subjected to a usual dipping treatment prior to vulcanization is heated at a temperature rising rate of 5° C./minute, while the elastic modulus E at 25° C. under a load of 49 N of the polyketone fiber cord is an elastic modulus as a unit of cN/dtex calculated from a tangent line at 49 N in S-S curve by a tensile test of the cord according to JIS.

In a preferable embodiment of the pneumatic radial tire according to the invention, an end count of the polyketone fiber cords in the belt reinforcing layer is 40 to 70 (cords/50 mm).

In the pneumatic radial tire according to the invention, it is preferable that the belt reinforcing layer is formed by spirally winding a rubberized strip-shaped sheet containing one or more reinforcing elements and having a width narrower than that of the belt reinforcing layer plural times in a widthwise direction of the tire so as to have a predetermined width.

In the pneumatic radial tire according to the invention, it is preferable that the polyketone fiber cord used in the belt reinforcing layer is formed by twisting two filament bundles made of polyketone. In this case, it is preferable that the polyketone fiber cord used in the belt reinforcing layer has a twisting coefficient α of 850 to 4000 defined by the following equation (III):

$$\alpha = T \times D^{1/2} \quad \text{(III)}$$

[wherein T is a twisting number (times/100 mm), and D is a total fineness (dtex) of the cord]. Also, it is more preferable that the polyketone fiber cord used in the belt reinforcing layer is formed by twisting two filament bundles of polyketone having a fineness of 500 to 3000 dtex.

In the pneumatic radial tire according to the invention, it is preferable that the polyketone fiber cord used in the belt reinforcing layer is formed by twisting one filament bundle of polyketone. In this case, the above second object can be achieved, and in particular the contact between the cords in the belt reinforcing layer and the cords in the belt can be prevented to suppress the belt edge separation (BES) while improving the steering stabilities during the low-speed running and high-speed running. Moreover, the polyketone fiber cord used in the belt reinforcing layer has a twisting coefficient α of 300 to 1300 defined by the following equation (III):

$$\alpha = T \times D^{1/2} \quad \text{(III)}$$

[wherein T is a twisting number (times/100 mm), and D is a total fineness (dtex) of the cord]. Furthermore, it is more preferable that the polyketone fiber cord used in the belt reinforcing layer is formed by twisting one filament bundle of polyketone having a fineness of 500 to 3000 dtex.

In another preferable embodiment of the pneumatic radial tire according to the invention, the polyketone has substantially a repeating unit represented by the following general formula (IV):

[wherein A is a moiety derived from an unsaturated compound polymerized with unsaturated bonds, and may be same or different in each of repeating units]. Moreover, it is particularly preferable that A in the formula (IV) is ethylene group.

In the pneumatic radial tire according to the invention, it is preferable that the polyketone fiber cord has a reversibility wherein it shrinks at an elevated temperature and stretches in the turning to room temperature.

According to the invention, there can be provided a pneumatic radial tire provided with a belt reinforcing layer containing as a reinforcing element the polyketone fiber cords having the specified thermal shrinkage stress and elastic modulus and being excellent in the steering stabilities during the low-speed running and high-speed running.

According to the invention, there can be also provided a pneumatic radial tire provided with a belt reinforcing layer containing as a reinforcing element the polyketone fiber cords having the specified thermal shrinkage stress and elastic modulus and the single-twist structure and being excellent in the steering stabilities during the low-speed running and the high-speed running but also suppressing a belt edge separation (BES) without contacting cords in a belt reinforcing layer and cords in a belt with each other.

BEST MODE FOR CARRYING OUT THE INVENTION

Figure 1:
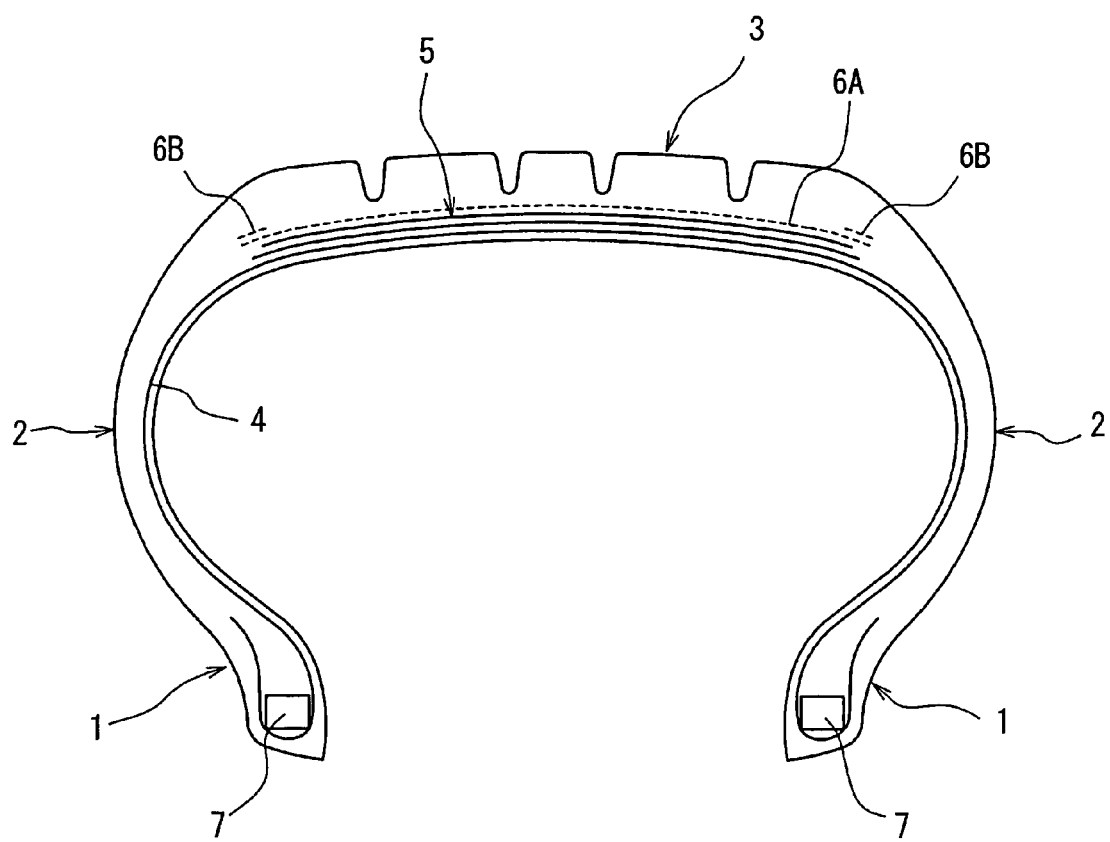
FIG. 1 is a sectional view of an embodiment of the pneumatic radial tire according to the invention.
Figure 2:
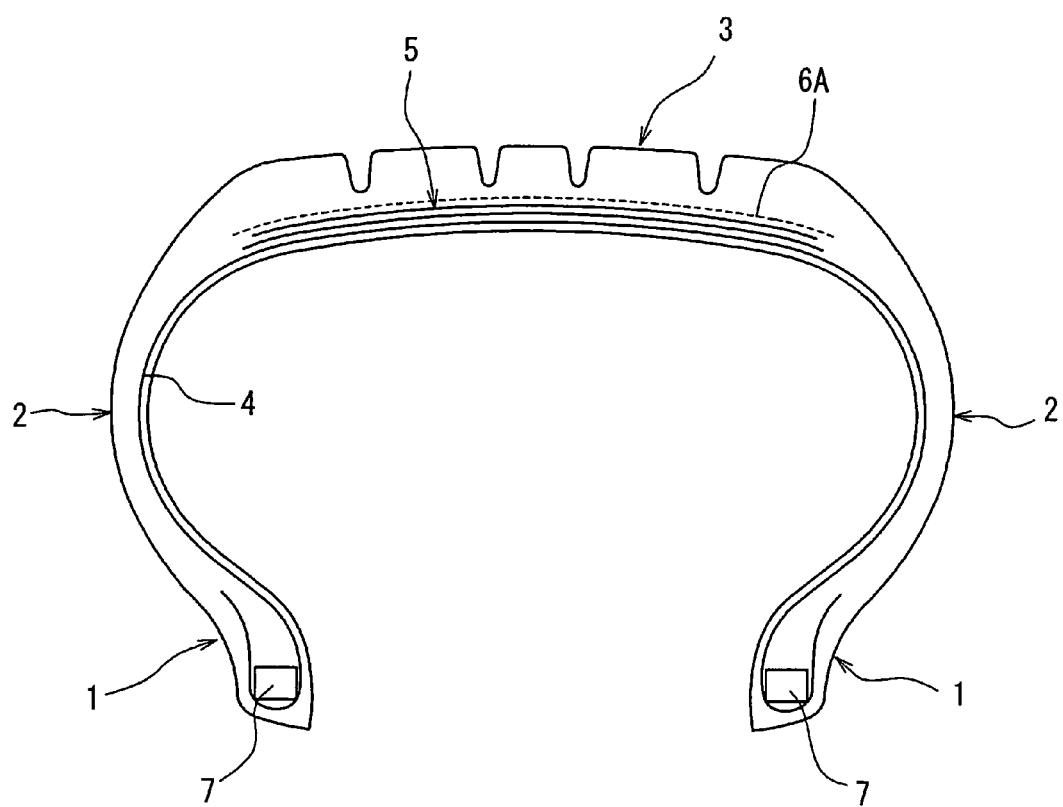
FIG. 2 is a sectional view of another embodiment of the pneumatic radial tire according to the invention.
Figure 3:
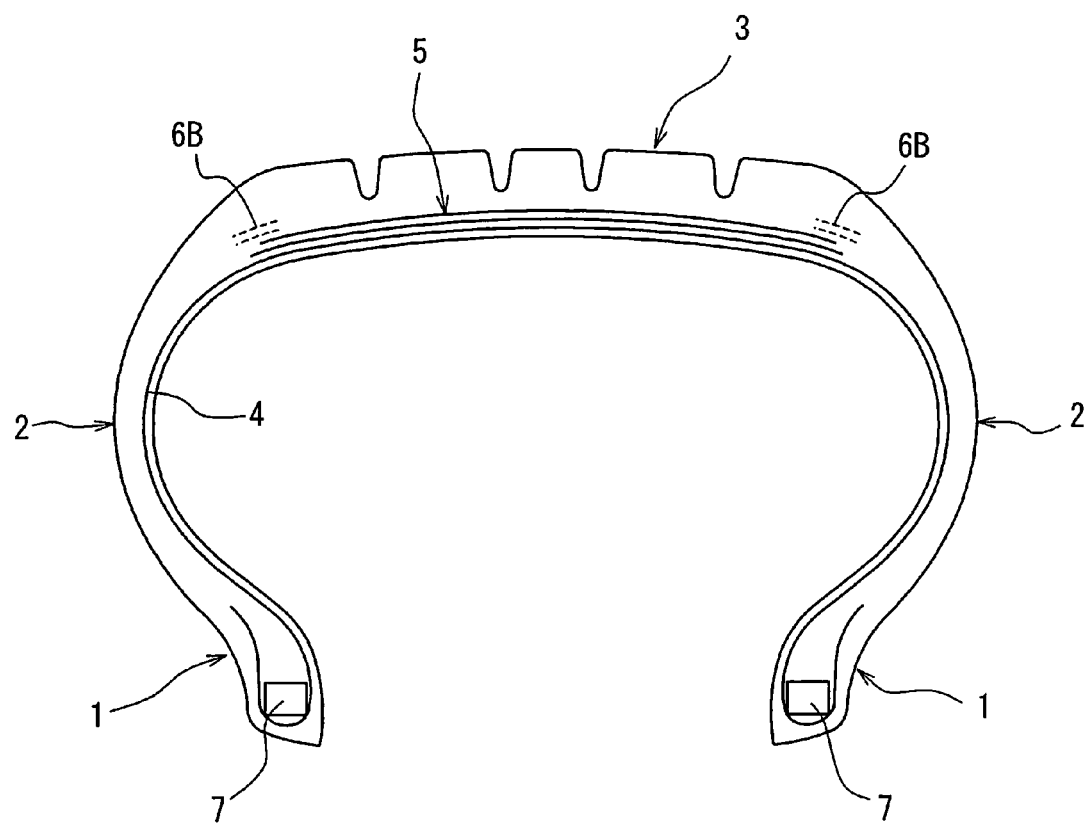
FIG. 3 is a sectional view of a further embodiment of the pneumatic radial tire according to the invention.

The invention will be described in detail below with reference to the attached drawings. FIG. 1 is a sectional view of an embodiment of the pneumatic radial tire according to the invention and FIGS. 2 and 3 are sectional views of other embodiments of the pneumatic radial tire according to the invention.

The radial tire shown in FIG. 1 comprises a pair of bead portions 1, a pair of sidewall portions 2, a tread portion 3 continuing to both the sidewall portions 2, a radial carcass 4 toroidally extending between the pair of bead portions 1 and reinforcing these portions 1, 2, 3, a belt 5 disposed on an outside of a crown portion of the carcass 4 in a radial direction of the tire and comprised of at least two belt layers, a belt reinforcing layer 6A disposed at an outside of the belt 5 in the radial direction of the tire so as to cover a whole of the belt 5, and a pair of belt reinforcing layers 6B disposed at the outside of the belt reinforcing layer 6A in the radial direction of the tire so as to cover both end portions of the belt 5.

The illustrated radial carcass 4 is composed of one carcass ply and consists of a main body portion toroidally extending between a pair of bead cores 7 embedded in the respective bead portions 1 and a turnup portion wound around each bead core 7 from an inside to an outside in a widthwise direction of the tire. In the pneumatic radial tire according to the invention, the ply number and the structure of the radial carcass 4 are not limited thereto.

In the illustrated radial tire, the belt 5 composed of two belt layers is disposed on the outside of the crown portion of the radial carcass 4 in the radial direction of the tire. The belt layer is commonly composed of a rubberized layer containing cords slantly extending with respect to an equatorial plane of the tire, preferably a rubberized steel cord layer. Further, the two belt layer are stacked so as to cross the cords constituting the belt layers with each other with respect to the equatorial plane of the tire to thereby constitute the belt 5. The illustrated belt 5 is composed of two belt layers, but the number of belt layers constituting the belt 5 may be three or more in the pneumatic radial tire according to the invention.

In the pneumatic radial tire according to the invention, each of the belt reinforcing layers 6A, 6B is composed of a rubberized layer containing the reinforcing elements arranged substantially in parallel to the circumferential direction of the tire, wherein the reinforcing element is required to be the polyketone fiber cord mentioned later.

In the radial tire shown in FIG. 1, the one belt reinforcing layer 6A covering the whole of the belt 5 and the one belt reinforcing layer 6B covering each of the end portions of the belt 5 are disposed on the outside of the belt 5 in the radial direction of the tire, but the number in each of the belt reinforcing layer 6A and the belt reinforcing layer 6B may be two or more.

The radial tire according to the invention is not particularly limited as long as it comprises one or more belt reinforcing layers on the outside of the belt 5 in the radial direction of the tire. For example, an embodiment wherein the belt reinforcing layer 6A covering the whole of the belt 5 is only disposed on the outside of the belt 5 in the radial direction of the tire as shown in FIG. 2 and an embodiment wherein the belt reinforcing layers 6B covering both end portions of the belt 5 are only disposed on the outside of the belt 5 in the radial direction of the tire as shown in FIG. 3 are one preferable embodiment of the radial tire according to the invention. The belt reinforcing layer 6A in FIG. 2 is composed of one layer and the belt reinforcing layers 6B in FIG. 3 are composed of two layers, but the number of the belt reinforcing layers 6A, 6B are not limited thereto.

In the pneumatic radial tire according to the invention, the reinforcing element constituting the belt reinforcing layers 6A, 6B is required to be the polyketone fiber cord satisfying the conditions of the following equations (I) and (II):

$$\sigma \geq -0.01 \times E + 1.2 \quad \text{(I)}$$

$$\sigma \geq -0.02 \quad \text{(II)}$$

[wherein $\sigma$ is a thermal shrinkage stress (cN/dtex) at 177° C.; and E is an elastic modulus (cN/dtex) at 25° C. under a load of 49 N]. The twisting structure of the polyketone fiber cord is not particularly limited, and as the polyketone fiber cord may be used, for example, a polyketone fiber cord formed by twisting two filament bundles of polyketone and a polyketone fiber cord formed by twisting one filament bundle of polyketone.

Since the polyketone fiber cord has a large thermal shrinkage stress at a high temperature, even if the polyketone fiber cord is disposed in the tire so as to ensure a sufficient ground contacting area during the low-speed running, a sufficient thermal shrinkage stress is generated in the cord as the temperature in the tire is raised during the high-speed running, whereby the belt reinforcing layers 6A, 6B develop a sufficient hoop effect to suppress the pushing-out of the tread due to the centrifugal force. Therefore, the steering stability during the low-speed running and the steering stability during the high-speed running can be simultaneously established by using the polyketone fiber cord satisfying the equations (I) and (II). Incidentally, when a usual fiber cord is used, the steering stability during the low-speed running and the steering stability during the high-speed running cannot be established because there is a conflicting relationship therebetween. Both the steering stabilities can be first established by using the polyketone fiber cord satisfying the equations (I) and (II).

In the invention, the equation (I) is derived as described below in view of the tire performances. As a force suppressing a change of the tire shape during the high-speed running are existent a drag F1 passively developed by the belt reinforcing layer against an input from exterior (for example, centrifugal force and strain) and a drag F2 actively developed by the belt reinforcing layer due to a heat generation. That is, a sum of F1 and F2 is required to be over a certain level in order to effectively suppress the change of the tire shape during the high-speed running. When contributing ratios of the F1 and F2 are respectively $\beta$ and $\gamma$ (wherein $\beta > 0$ and $\gamma > 0$), there is derived the following equation:

$$\beta \times F1 + \gamma \times F2 > \delta$$

(wherein $\delta$ is a standard value based on a tire size or a velocity and $\delta > 0$). In this case, a mainly dominant factor of F1 includes a stiffness EC of the cord in the belt reinforcing layer, while a mainly dominant factor of F2 includes a thermal shrinkage stress HF of the cord in the belt reinforcing layer. By substituting EC as F1 and HF as F2 for the above equation is derived the following equation:

$$HF > -\beta/\gamma \times EC + \delta/\gamma$$

When the thermal shrinkage stress $\sigma$ at 177° C. of the cord is used as HF and the elastic modulus E at 25° C. under a load of 49 N of the cord is used as EC, the thermal shrinkage stress $\sigma$ is required to be in an upper domain of gradient $(-\beta/\gamma) \times$ elastic modulus E+intercept $(\delta/\gamma)$. The inventor has studied and discovered that when the gradient $(-\beta/\gamma)$ is $-0.01$ and the intercept $(\delta/\gamma)$ is 1.2, or when the thermal shrinkage stress $\sigma$ and the elastic modulus E satisfy the relationship of the equation (I), the change of the tire shape during the high-speed running can be effectively suppressed.

Incidentally, when the cord used does not satisfy the relationship of the equation (I), as a cord having a large thermal shrinkage stress $\sigma$ but a low elastic modulus E is used, the hoop effect of the belt reinforcing layer during the high-speed running decreases, while as a cord having a high elastic modulus E but a small thermal shrinkage stress $\sigma$ is used, the ground contacting area of the tire during the low-speed running can not be ensured sufficiently. Therefore, the steering stabilities during the low-speed running and the high-speed running can not be simultaneously improved in both cases.

Also, when the cord used does not satisfy the relationship of the equation (II), since the thermal shrinkage stress $\sigma$ is too small at a high temperature, i.e. during the high-speed running, if the cord is disposed so as to ensure the ground contacting area during the low-speed running, the hoop effect of the belt reinforcing layers 6A, 6B is insufficient and the tread is pushed out to largely change the ground contacting shape, and hence the steering stability of the tire during the high-speed running is deteriorated, while if the cord is disposed so that the belt reinforcing layers 6A, 6B can sufficiently develop the hoop effect during the high-speed running, the ground contacting area cannot be sufficiently ensured during the low-speed running, and hence the steering stability of the tire during the low-speed running is deteriorated.

The polyketone fiber cord is preferable to have a thermal shrinkage stress σ at 177° C. of not more than 1.5 cN/dtex. When the thermal shrinkage stress σ at 177° C. of the polyketone fiber cord exceeds 1.5 cN/dtex, the shrinkage force during the vulcanization becomes excessively large, and as a result, the cord disorder and rubber disarray inside the tire are caused to bring about the deteriorations of the durability and uniformity. Also, the polyketone fiber cord more preferably has a thermal shrinkage stress σ at 177° C. of not more than 1.30 cN/dtex, more preferably not more than 0.90 cN/dtex in view of preventing the cords in the belt from contacting with the polyketone fiber cords in the belt reinforcing layer during the vulcanization of a green tire to suppress the deterioration of the durability of the tire. Furthermore, the polyketone fiber cord preferably has a thermal shrinkage stress σ at 177° C. of not less than 0.05 cN/dtex, more preferably not less than 0.15 cN/dtex, even more preferably more than 0.4 cN/dtex in view of sufficiently suppressing the pushing-out of the tread during the high-speed running. Moreover, the polyketone fiber cord preferably has an elastic modulus E at 25° C. under a load of 49 N of not less than 60 cN/dtex, more preferably not less than 100 cN/dtex in view of sufficiently suppressing the pushing-out of the tread during the high-speed running.

In view of preventing the cords in the belt reinforcing layers 6A, 6B from contacting with the cords in the belt 5 to suppress the belt edge separation (BES), the polyketone fiber cord used in the belt reinforcing layers 6A, 6B is preferable to be formed by twisting one filament bundle of polyketone. When the polyketone fiber cord is a cord formed by twisting one filament bundle of polyketone, it is possible to prevent a cord diameter from being thick. Therefore, when the polyketone fiber cord formed by twisting one filament bundle of polyketone is used as the reinforcing element in the belt reinforcing layers 6A, 6B, the interlayer gauge between the belt 5 and the belt reinforcing layers 6A, 6B can be sufficiently ensured to prevent the cords in the belt 5 from contacting with the cords in the belt reinforcing layers 6A, 6B, and hence the belt edge separation (BES) can be suppressed. In general, when a cord having a high elasticity is used in the belt reinforcing layers 6A, 6B, it is difficult to ensure the interlayer gauge between the belt 5 and the belt reinforcing layers 6A, 6B, but it is possible to ensure the interlayer gauge by using the cord formed by twisting one filament bundle of polyketone having a high elasticity.

In the belt reinforcing layers 6A, 6B of the pneumatic radial tire according to the invention, the end count of the polyketone fiber cord is preferable to be within a range of 40 to 70 (cords/50 mm). When the end count of the polyketone fiber cord in the belt reinforcing layer is less than 40 (cords/50 mm), the belt reinforcing performance of the belt reinforcing layer becomes small. While, when the end count of the polyketone fiber cord in the belt reinforcing layer exceeds 70 (cords/50 mm), the tire weight increases but also the stiffness of the cord rubberized at room temperature becomes excessively high and the ground contacting area during the low-speed running becomes small in the case that the polyketone fiber cord is formed by twisting two filament bundles of polyketone, while the stiffness of the cord rubberized becomes excessively high and the belt is easily contacted with the belt reinforcing layer due to the expansion during the vulcanization of the tire and the thermal shrinkage stress to cause the BES in the case that the polyketone fiber cord is formed by twisting one filament bundle of polyketone.

When the polyketone fiber cord used in the belt reinforcing layers 6A, 6B is formed by twisting two filament bundles of polyketone, it is preferable that the polyketone fiber cord has a twisting coefficient α of 850 to 4000 defined by the following equation (III):

$$\alpha = T \times D^{1/2} \tag{III}$$

[wherein T is a twisting number (times/100 mm), and D is a total fineness (dtex) of the cord]. When the twisting coefficient α of the polyketone fiber cord is less than 850, the thermal shrinkage stress cannot be sufficiently ensured, while when it exceeds 4000, the elastic modulus cannot be sufficiently ensured (i.e., the belt reinforcing performance is small).

Moreover, when the polyketone fiber cord used in the belt reinforcing layers 6A, 6B is formed by twisting two filament bundles of polyketone, it is further preferable that the polyketone fiber cord is formed by twisting two filament bundles of polyketone having a fineness of 500 to 3000 dtex. When the fineness of the filament bundle used in the polyketone fiber cord is less than 500 dtex, both the elastic modulus and the thermal shrinkage stress are insufficient, while when it exceeds 3000 dtex, the cord diameter becomes thick and the end count can not be made dense.

On the other hand, when the polyketone fiber cord used in the belt reinforcing layers 6A, 6B is formed by twisting one filament bundle of polyketone, it is preferable that the polyketone fiber cord has a twisting coefficient α of 300 to 1300 defined by the following equation (III):

$$\alpha = T \times D^{1/2} \tag{III}$$

[wherein T is a twisting number (times/100 mm), and D is a total fineness (dtex) of the cord]. When the twisting coefficient α of the polyketone fiber cord is less than 300, the thermal shrinkage stress can not be sufficiently developed, while when it exceeds 1300, the elastic modulus can not be sufficiently developed (i.e., the belt reinforcing performance is small).

Moreover, when the polyketone fiber cord used in the belt reinforcing layers 6A, 6B is formed by twisting one filament bundle of polyketone, it is further preferable that the polyketone fiber cord is formed by twisting one filament bundle of polyketone having a fineness of 500 to 3000 dtex. When the fineness of the filament bundle used in the polyketone fiber cord is less than 500 dtex, the elastic modulus can not be sufficiently developed (i.e., the belt reinforcing performance is small), while when it exceeds 3000 dtex, the elastic modulus and the thermal shrinkage stress per cord become excessively high to cause the contact of the cords in the belt reinforcing layer with the cords in the belt layer.

The polyketone fiber cord used in the belt reinforcing layers 6A, 6B is preferable to have a reversibility of shrinking at an elevated temperature and stretching in the turning to room temperature. In this case, the polyketone fiber cords in the belt reinforcing layer shrink to develop the sufficient hoop effect at an elevated temperature or during the high-speed running, and hence the pushing-out of the tread can be sufficiently suppressed, while the polyketone fiber cords in the belt reinforcing layer stretch at low temperature or during the low-speed running, and hence the ground contacting area can be sufficiently ensured. Moreover, by using the reversible polyketone fiber cord having a difference between the thermal shrinkage stresses at 20° C. and 177° C. of not less than 0.20 cN/dtex, preferably not less than 0.25 cN/dtex, the effects during the normal running and high-speed running can be simultaneously established.

The reinforcing element constituting the belt reinforcing layer in the pneumatic radial tire according to the invention is required to be the polyketone fiber cord satisfying the conditions of the equations (I) and (II). As a polyketone being a raw material of the polyketone fiber cord is preferable a polyketone substantially having a repeating unit represented by the formula (IV). Moreover, among the polyketones, a polyketone wherein not less than 97 mol % of the repeating unit is 1-oxotrimethylene [—$CH_2$—$CH_2$—CO—] is preferable, a polyketone wherein not less than 99 mol % is 1-oxotrimethylene is more preferable, and a polyketone wherein 100 mol % is 1-oxotrimethylene is most preferable.

In the polyketone as the raw material of the polyketone fiber cord, ketone groups may be partly bonded with each other or moieties derived from the unsaturated compound may be bonded with each other, but it is preferable that a ratio of alternate arrangement of the moiety derived from the unsaturated compound and the ketone group is not less than 90% by mass, more preferably not less than 97% by mass, most preferably 100% by mass.

The unsaturated compound forming A in the formula (IV) is most preferably ethylene, and may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl metacrylate, vinyl acetate, acrylamide, hydroxyethyl metacrylate, undecenic acid, undecenol, 6-chlorohexene, N-vinylpyrolidone, diethylester of sulnylphosphonic acid, sodium styrenesulfonate, sodium allylsulfonate, vinylpyrolidone, vinyl chloride or the like; and so on.

As the polymerization degree of the polyketone, it is preferable that a limit viscosity ($\eta$) defined by the following formula:

$$[\eta] = \lim_{C \to 0} \frac{(T-t)}{(t \cdot C)}$$

[wherein t is a passing time of hexafluoroisopropanol having a purity of not less than 98% at 25° C. through a viscosity tube, and T is a passing time of a diluted solution of polyketone dissolved in hexafluoroisopropanol at 25° C. through the viscosity tube; and C is a mass (g) of a solute in 100 mL of the diluted solution] is within a range of 1 to 20 dL/g, more preferably 2 to 10 dL/g, even more preferably 3 to 8 dL/g. When the limit viscosity is less than 1 dL/g, the molecular weight is too small and it is difficult to obtain a high-strength polyketone fiber cord, but also troubles such as napping, breaking and the like are frequently caused in the steps of spinning, drying and drawing. While, when the limit viscosity exceeds 20 dL/g, the synthesis of the polymer takes great time and cost, but also it is difficult to uniformly dissolve the polymer, which may badly affect the spinability and properties.

As a method for forming polyketone fiber are preferable (1) a method comprising the steps of spinning an undrawn fiber and subjecting to a multi-stage heat drawing in which a final drawing at the multi-stage heat drawing step is carried out at specified temperature and draft ratio, and (2) a method comprising the steps of spinning an undrawn fiber, subjecting to heat drawing and then quenching under a high tension. By forming the polyketone fiber through the method (1) or (2), desirable filaments suitable for the production of the polyketone fiber cord can be obtained.

The method for spinning the undrawn polyketone fiber is not particularly limited, but may adopt the conventionally known methods. Concretely, there are mentioned a wet spinning method using an organic solvent such as hexafluoroisopropanol, m-cresol or the like as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221. Among them, the wet spinning method using the aqueous solution of the salt is preferable.

In the wet spinning method using the organic solvent, a polyketone polymer is dissolved in hexafluoroisopropanol, m-cresol or the like at a concentration of 0.25 to 20% by mass and extruded through a spinning nozzle to from a fiber and then the solvent is removed in a non-solvent bath of toluene, ethanol, isopropanol, n-hexane, isooctane, acetone, methyl ethyl ketone or the like, whereby the undrawn polyketone fiber can be obtained after the washing.

In the wet spinning method using the aqueous solution, the polyketone polymer is dissolved in an aqueous solution of zinc salt, calcium salt, thiocyanate, iron salt or the like at a concentration of 2 to 30% by mass and extruded from a spinning nozzle into a coagulation bath at 50 to 130° C. to conduct gel spinning and then desalted and dried to obtain the undrawn polyketone fiber. In the aqueous solution dissolving the polyketone polymer, it is preferable to use a mixture of a zinc halide and a halide of an alkali metal or an alkaline earth metal. In the coagulation bath can be used water, an aqueous solution of a metal salt, or an organic solvent such as acetone, methanol or the like.

As the method for drawing the undrawn fiber is preferable a heat drawing method wherein the undrawn fiber is drawn by heating to a temperature higher than the glass transition temperature of the undrawn fiber. Moreover, the drawing of the undrawn fiber in the above method (2) may be carried out at one stage, but it is preferable to conduct the multi-stage drawing. The heat drawing method is not particularly limited, and may adopt a method of running the fiber on, for example, a heat roll or a heat plate, and so on. At this moment, the heat drawing temperature is preferably within a range of 110° C. to (a melting point of polyketone), and the total drawing ratio is preferably not less than 10 times.

When the formation of the polyketone fiber is carried out through the method (1), the temperature at the final drawing step of the multi-stage drawing is preferable to be within a range of 110° C. to (drawing temperature at drawing step just before the final drawing step −3° C.), and the drawing ratio at the final drawing step is preferable to be within a range of 1.01 to 1.5 times. On the other hand, when the formation of the polyketone fiber is carried out through the method (2), the tension applied to the fiber after the heat drawing is preferable to be within a range of 0.5 to 4 cN/dtex, and the cooling rate in the quenching is preferable to be not less than 30° C./second, and the cooling-end temperature in the quenching is preferable to be not higher than 50° C. The quenching method of the heat-drawn polyketone fiber is not particularly limited, and may adopt the conventionally known methods. Concretely, the cooling method using the roll is preferable. Moreover, the thus obtained polyketone fiber is large in the retention of elastic strain, so that it is preferable that the fiber is usually subjected to a relaxation heat treatment so as to make the fiber length shorter than the fiber length after the heat drawing. At this moment, the temperature of the relaxation heat treatment is preferable to be within a range of 50 to 100° C. and the relaxation ratio is preferable to be within a range of 0.980 to 0.999.

The production method of the polyketone fiber cord is not particularly limited. When the polyketone fiber cord is a structure formed by twisting two filament bundles of polyketone or a twin strand structure, it can be obtained as a twisted cord, for example, by ply-twisting the filament bundles of polyketone, combining two bundles and then cable-twisting them in an opposite direction. On the other hand, when the raw polyketone fiber cord is a structure formed by twisting one filament bundle of polyketone or a single strand structure, it can be obtained as a twisted cord, for example, by aligning and twisting the filament bundle of polyketone in one direction.

The polyketone fiber cords thus obtained are rubberized to obtain a cord/rubber composite used in the belt reinforcing layers 6A, 6B. The coating rubber for the polyketone fiber cord is not particularly limited, and a coating rubber used in the conventional belt reinforcing layer can be used. Moreover, the polyketone fiber cord may be treated with an adhesive to improve adhesiveness with the coating rubber before the rubberization of the polyketone fiber cords.

The pneumatic radial tire according to the invention can be produced by applying the above-mentioned cord/rubber composite, which is formed by rubberizing the polyketone fiber cord, to the belt reinforcing layers 6A, 6B according to the usual method. In the pneumatic radial tire according to the invention, as a gas filled into the tire can be used usual air or air having a regulated partial oxygen pressure but also inert gases such as nitrogen, argon, helium and so on.

In the production of the pneumatic radial tire according to the invention, it is preferable that each of the belt reinforcing layers 6A, 6B is formed by spirally winding the rubberized strip-shaped sheet containing one or more reinforcing elements and having a width narrower than those of the belt reinforcing layers 6A, 6B to be disposed plural times in a widthwise direction of the tire so as to have a predetermined width. When the reinforcing layers 6A, 6B are formed by continuously and spirally winding the strip-shaped sheet, a joint portion is not formed in the circumferential direction of the tire and the belt 5 can be uniformly reinforced.

Examples

The following examples are given in illustration of the invention and are not intended as limitations thereof.

There are prepared radial tires having a tire size of 235/55R15 and a structure shown in FIG. 2 according to the usual method. These tires to be tested are similar to each other except for the cord used in the belt reinforcing layer, in which the belt of each test tire is composed of two steel belt layers, and the belt layer located inside in the radial direction of the tire has a width of 200 mm and the belt layer located outside in the radial direction of the tire has a width of 190 mm.

Moreover, the belt reinforcing layer 6A adjacent to the belt and covering the whole of the belt is disposed so as to fall out from each of the belt edges by 10 mm outward in the widthwise direction of the tire.

Moreover, the belt reinforcing layer of the test tire is produced by spirally (helically) winding the rubberized strip-shaped sheet containing cords made of a material shown in Table 1 on the belt outward in the radial direction of the tire so as to be substantially arranged in parallel to the circumferential direction. The cord used is made by ply-twisting raw yarns each having a predetermined fineness, combining two yarns and further cable-twisting. With respect to the resulting test tires, the ground contacting area, steering stabilities during the low-speed running and the high-speed running and the pushing-out degree of the tread are measured according to the following methods. The results are shown in Table 1.

(1) Ground Contacting Area

The tire is inflated at an inner pressure of 1.7 kg/cm$^2$ (1.67×10$^5$ Pa) and coated with an ink and pushed on a Kent paper under a load specified by JATMA or JIS to obtain a footprint. The ground contacting area is calculated from the footprint.

(2) Steering Stabilities During the Low-Speed Running and the High-Speed Running The test tire regulated to have an inner pressure of 1.7 kg/cm$^2$ (1.67×10$^5$ Pa) is set on a drum having an outer diameter of 3000 mm, and then preliminarily run at a predetermined speed under a load specified by JATMA or JIS based on the tire size and inner pressure for 30 minutes, and thereafter the inner pressure is again regulated to 1.7 kg/cm$^2$ under no load, and slip angles are continuously made on the drum up to plus and minus 14° under the predetermined load at the predetermined speed again. Cornering forces (CF) at each of the plus and minus angles are measured and a cornering power ($C_p$ value) is determined according to the following equation:

$$C_p(\text{kg}/\text{degree}) = \frac{CF(1°)(\text{kg}) + CF(2°)(\text{kg})/2 + CF(3°)(\text{kg})/3 + CF(4°)(\text{kg})/4}{4°}$$

Moreover, indexes are calculated by dividing the $C_p$ value of each test tire on the basis that indexes of the tire using nylon (i.e., Comparative Example 1 in Table 1 and Comparative Example 5 in Table 2) are 100. The larger the index value, the better the steering stability.

(3) Pushing-Out Degree of the Tread

The pushing-out degree of the tread end portion at a speed of 200 km/h under an inner pressure of 1.7 kg/cm$^2$ and a load specified by JATMA or JIS is measured and determined by a photo shoot. Moreover, a difference between the pushing-out degree at 40 km/h as a standard condition and the pushing-out degree at 200 km/h is evaluated.

TABLE 1

| | | Comparative Example 1 | Comparative Example 2 | Comparative Example 3 | Comparative Example 4 | Example 1 |
|---|---|---|---|---|---|---|
| Material of cord for the belt reinforcing layer | — | Nylon | Aramid | Polyketone *2 | Polyketone *2 | Polyketone *1 |
| Structure of cord to be examined | dtex | 1400/2 | 1670/2 | 1670/2 | 1670/2 | 1670/2 |
| Ply-twisting number × Cable-twisting number | turns/100 mm | 26 × 26 | 39 × 39 | 47 × 47 | 15 × 15 | 15 × 15 |

TABLE 1-continued

| | | | | | | |
|---|---|---|---|---|---|---|
| Elastic modulus E of cord at 25° C. under a load of 49 N | cN/dtex | 38 | 159 | 41 | 72 | 174 |
| Thermal shrinkage stress σ of cord heated at 177° C. | cN/dtex | 0.17 | 0.00 | 0.28 | 0.16 | 0.23 |
| End count of cords | cords/50 mm | 50 | 50 | 50 | 50 | 50 |
| Twisting coefficient α of cord | — | 1376 | 2254 | 2847 | 867 | 867 |
| Ground contacting area at room temperature | cm² | 240 | 198 | 240 | 238 | 232 |
| Steering stability during the low-speed (40 km/h) running | index | 100 | 72 | 98 | 102 | 94 |
| Steering stability during the high-speed (180 km/h) running | index | 100 | 131 | 104 | 99 | 123 |
| Pushing-out degree of the tread during 180 km/h running | mm | 8 | 0 | 6 | 6 | 0 |

| | | Example 2 | Example 3 | Example 4 |
|---|---|---|---|---|
| Material of cord for the belt reinforcing layer | — | Polyketone *1 | Polyketone *1 | Polyketone *1 |
| Structure of cord to be examined | dtex | 1670/2 | 1100/2 | 1100/2 |
| Ply-twisting number × Cable-twisting number | turns/100 mm | 39 × 39 | 19 × 19 | 47 × 47 |
| Elastic modulus E of cord at 25° C. under a load of 49 N | cN/dtex | 145 | 168 | 143 |
| Thermal shrinkage stress σ of cord heated at 177° C. | cN/dtex | 0.51 | 0.22 | 0.50 |
| End count of cords | cords/50 mm | 50 | 50 | 50 |
| Twisting coefficient α of cord | — | 2254 | 891 | 2204 |
| Ground contacting area at room temperature | cm² | 240 | 236 | 243 |
| Steering stability during the low-speed (40 km/h) running | index | 102 | 98 | 104 |
| Steering stability during the high-speed (180 km/h) running | index | 145 | 127 | 139 |
| Pushing-out degree of the tread during 180 km/h running | mm | 0 | 0 | 0 |

*1 Polyketone wherein about 100% thereof has the repeating unit represented by the formula (IV) and not less than 97 mol % of the repeating unit is 1-oxotrimethylene.
*2 Polyketone having the repeating unit represented by the formula (IV) wherein A is mainly ethylene group (containing about 6% of propylene).

As seen from Table 1, the tires in the Examples using the polyketone fiber cord satisfying the formulae (I) and (II) as a reinforcing element in the belt reinforcing layer are large in the ground contacting area at room temperature, so that they are excellent in the steering stability during the low-speed running. Furthermore, they suppress the pushing-out of the tread under the high-speed running, so that they are also excellent in the steering stability during the high-speed running.

On the other hand, the tire of Comparative Example 1 using the nylon cord as a reinforcing element in the belt reinforcing layer is large in the pushing-out of the tread during the high-speed running, so that the steering stability during the high-speed running is inferior to those of the Examples. Also, the tire of Comparative Example 2 using the aramid cord as a reinforcing element in the belt reinforcing layer is small in the ground contacting area at room temperature, so that the steering stability during the low-speed running is inferior to those of Comparative Example 1 and Examples.

Also, there are prepared radial tires having a tire size of 205/65R15 and a structure shown in FIG. 1 according to the usual method. These tires to be tested are similar to each other except for the cord used in the belt reinforcing layer, in which the belt of the test tire is composed of two steel belt layers, and the belt layer located inside in the radial direction of the tire has a width of 160 mm and the belt layer located outside in the radial direction of the tire has a width of 150 mm. Moreover, the belt reinforcing layer 6A adjacent to the belt and covering the whole of the belt is disposed so as to fall out from each of the belt edges by 5 mm outward in the widthwise direction of the tire, and further the belt reinforcing layers 6B only covering both end portions of the belt are disposed on the belt reinforcing layer 6A outward in the radial direction of the tire over a width of 25 mm from the end portions of the belt reinforcing layer 6A inward in the widthwise direction of the tire, respectively.

Moreover, the belt reinforcing layer of the test tire is produced by spirally (helically) winding the rubberized strip-shaped sheet containing cords of a material shown in Table 2 on the belt outward in the radial direction of the tire so as to be substantially arranged in parallel to the circumferential direction. The cord used is made by twisting raw yarns each having a predetermined fineness in one direction in case of a single strand structure, while it is made by ply-twisting raw yarns each having a predetermined fineness, combining two yarns and further cable-twisting in case of a twin strand structure. With respect to the resulting test tires, the ground contacting area, steering stabilities during the low-speed running and the high-speed running and the pushing-out degree of the tread are measured according to the aforementioned methods, and further the interlayer gauge between the belt and the belt reinforcing layer and the durability to belt edge separation are measured according to the following methods. The results are shown in Table 2.

(4) Interlayer Gauge Between the Belt and the Belt Reinforcing Layer

The tire is cut in the widthwise direction, and the shortest distances between the first to fifth belt cords from the outside in the widthwise direction of the belt layer located outside in the radial direction at its section and the nearest cap cords (cords in the belt reinforcing layer 6A) are measured, and an average on the five cords is calculated.

(5) Durability to Belt Edge Separation (BES)

Four same tires are mounted onto a vehicle and actually run on a general road over a distance of 20000 km, and thereafter taken out therefrom and cut to measure a circumferential length of a portion causing the separation at the end portions of the belt. Indexes are determined by dividing with the separation length of each tire on the basis that an index of the tire using nylon (i.e., Comparative Example 5) is 100. The larger the index value, the higher and better the BES durability.

TABLE 2

|  |  | Comparative Example 5 | Comparative Example 6 | Comparative Example 7 | Comparative Example 8 | Comparative Example 9 |
|---|---|---|---|---|---|---|
| Material of cord for the belt reinforcing layer | — | Nylon | Aramid | Polyketone *1 | Polyketone *2 | Polyketone *2 |
| Structure of cord to be examined | dtex | 1400/2 | 1670/2 | 1670/2 | 1670/1 | 1670/1 |
| Twisting Number (Ply-twisting number × Cable-twisting number) | turns/ 100 mm | 26 × 26 | 39 × 39 | 15 × 15 | 16 | 24 |
| Elastic modulus E of cord at 25° C. under a load of 49 N | cN/dtex | 38 | 159 | 174 | 66 | 53 |
| Thermal shrinkage stress σ of cord heated at 177° C. | cN/dtex | 0.17 | 0.00 | 0.23 | 0.17 | 0.21 |
| End count of cords | cords/ 50 mm | 50 | 50 | 50 | 50 | 50 |
| Twisting coefficient α of cord | — | 1376 | 2254 | 2254 | 653 | 980 |
| Ground contacting area at room temperature | cm$^2$ | 196 | 179 | 183 | 208 | 211 |
| Steering stability during the low-speed (40 km/h) running | index | 100 | 76 | 92 | 92 | 101 |
| Steering stability during the high-speed (180 km/h) running | index | 100 | 151 | 148 | 94 | 88 |
| Pushing-out degree of the tread during 180 km/h running | mm | 8.0 | 0.0 | 0.0 | 10 | 12 |
| Interlayer gauge between the belt and the belt reinforcing layer | mm | 0.3 | 0.0 | 0.0 | 0.4 | 0.5 |
| BES durability | index | 100 | 88 | 91 | 103 | 106 |

|  |  | Example 5 | Example 6 | Example 7 |
|---|---|---|---|---|
| Material of cord for the belt reinforcing layer | — | Polyketone *1 | Polyketone *1 | Polyketone *1 |
| Structure of cord to be examined | dtex | 1670/1 | 1670/1 | 1100/1 |
| Twisting Number (Ply-twisting number × Cable-twisting number) | turns/ 100 mm | 16 | 24 | 29 |
| Elastic modulus E of cord at 25° C. under a load of 49 N | cN/dtex | 138 | 124 | 123 |
| Thermal shrinkage stress σ of cord heated at 177° C. | cN/dtex | 0.63 | 0.72 | 0.79 |
| End count of cords | cords/ 50 mm | 50 | 50 | 50 |
| Twisting coefficient α of cord | — | 653 | 980 | 961 |
| Ground contacting area at room temperature | cm$^2$ | 194 | 196 | 196 |
| Steering stability during the low-speed (40 km/h) running | index | 102 | 112 | 114 |
| Steering stability during the high-speed (180 km/h) running | index | 128 | 134 | 122 |
| Pushing-out degree of the tread during 180 km/h running | mm | 2.1 | 1.3 | 1.9 |
| Interlayer gauge between the belt and the belt reinforcing layer | mm | 0.4 | 0.5 | 0.7 |
| BES durability | index | 126 | 138 | 142 |

*1 Polyketone wherein about 100% thereof has the repeating unit represented by the formula (IV) and not less than 97 mol % of the repeating unit is 1-oxotrimethylene.
*2 Polyketone having the repeating unit represented by the formula (IV) wherein A is mainly ethylene group (containing about 6% of propylene).

As seen from Table 2, the tires of Examples 5-7 using the polyketone fiber cord satisfying the formulae (I) and (II) and having a single strand structure as a reinforcing element in the belt reinforcing layer are large in the ground contacting area at room temperature, so that they are excellent in the steering stability during the low-speed running. Also, they suppress the pushing-out of the tread under the high-speed running, so that they are also excellent in the steering stability during the high-speed running. Furthermore, they are sufficient in the gauge between the belt and the belt reinforcing layer, so that they are also very excellent in the durability to belt edge separation.

On the other hand, the tire of Comparative Example 5 using the nylon cord as a reinforcing element in the belt reinforcing layer is large in the pushing-out of the tread during the high-speed running, so that the steering stability during the high-speed running is inferior to those of the Examples. Also, the tire of Comparative Example 6 using the aramid cord as a reinforcing element in the belt reinforcing layer is small in the ground contacting area at room temperature, so that the steering stability during the low-speed running are inferior to those of Comparative Example 5 and Examples 5-7, and further the durability to belt edge separation is bad because the gauge between the belt and the belt reinforcing layer is insufficient. Moreover, the tire of Comparative Example 7 using the polyketone fiber cord satisfying the formulae (I) and (II) but having a twin strand structure as a reinforcing element in the belt reinforcing layer is insufficient in the gauge between the belt and the belt reinforcing layer, so that it is bad in the durability to belt edge separation.

The invention claimed is:

1. A pneumatic radial tire comprising a pair of bead portions, a pair of sidewall portions, a tread portion continuing to both the sidewall portions, a carcass toroidally extending between the pair of bead portions, a belt disposed on a crown portion of the carcass outward in a radial direction of the tire and comprised of at least two belt layers, and at least one belt reinforcing layer disposed on the belt outward in the radial direction of the tire so as to cover a whole and/or both end portions of the belt and composed of a rubberized layer containing reinforcing elements substantially arranged in parallel to the circumferential direction of the tire, characterized in that the reinforcing element constituting the belt reinforcing layer is a polyketone fiber cord satisfying conditions of the following equations I and II:

$$\sigma \geq -0.01 \times E + 1.2 \qquad \text{I}$$

$$\sigma \geq -0.02 \qquad \text{II}$$

wherein $\sigma$ is a thermal shrinkage stress in cN/dtex at 177° C.; and E is an elastic modulus in cN/dtex at 25° C. under a load of 49 N.

2. A pneumatic radial tire according to claim 1, wherein an end count of the polyketone fiber cords in the belt reinforcing layer is 40 to 70 cords/50 mm.

3. A pneumatic radial tire according to claim 1, wherein the belt reinforcing layer is formed by spirally winding a rubberized strip-shaped sheet containing one or more reinforcing elements and having a width narrower than that of the belt reinforcing layer plural times in a widthwise direction of the tire so as to have a predetermined width.

4. A pneumatic radial tire according to claim 1, wherein the polyketone fiber cord used in the belt reinforcing layer is formed by twisting two filament bundles of polyketone.

5. A pneumatic radial tire according to claim 4, wherein the polyketone fiber cord used in the belt reinforcing layer has a twisting coefficient $\alpha$ of 850 to 4000 defined by the following equation III:

$$\alpha = T \times D^{1/2} \qquad \text{III}$$

wherein T is a twisting number in times/100 mm, and D is a total fineness dtex of the cord.

6. A pneumatic radial tire according to claim 4, wherein the polyketone fiber cord used in the belt reinforcing layer is formed by twisting two filament bundles of polyketone having a fineness of 500 to 3000 dtex.

7. A pneumatic radial tire according to claim 1, wherein the polyketone fiber cord used in the belt reinforcing layer is formed by twisting one filament bundle of polyketone.

8. A pneumatic radial tire according to claim 7, wherein the polyketone fiber cord used in the belt reinforcing layer has a twisting coefficient $\alpha$ of 300 to 1300 defined by the following equation III:

$$\alpha = T \times D^{1/2} \qquad \text{III}$$

wherein T is a twisting number in times/100 mm, and D is a total fineness dtex of the cord.

9. A pneumatic radial tire according to claim 7, wherein the polyketone fiber cord used in the belt reinforcing layer is formed by twisting one filament bundle of polyketone having a fineness of 500 to 3000 dtex.

10. A pneumatic radial tire according to claim 1, wherein the polyketone substantially has a repeating unit represented by the following general formula IV:

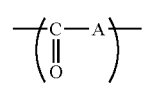

(IV)

wherein A is a moiety derived from unsaturated compounds polymerized with unsaturated bonds, and may be same or different in each of repeating units.

11. A pneumatic radial tire according to claim 10, wherein A in the formula IV is ethylene group.

12. A pneumatic radial tire according to claim 1, wherein the polyketone fiber cord has a reversibility of shrinking at an elevated temperature and stretching in the turning to room temperature.

* * * * *